US009400855B2

(12) United States Patent
Bumbalough et al.

(10) Patent No.: US 9,400,855 B2
(45) Date of Patent: Jul. 26, 2016

(54) METHOD, COMPUTER PROGRAM PRODUCT AND APPARATUS FOR PROVIDING A BUILDING OPTIONS CONFIGURATOR

(75) Inventors: Steven Eugene Bumbalough, Arlington, TX (US); Gary Ned Sharp, Lewisville, TX (US); Chris Arps, Allen, TX (US); Darwin Wayne Belt, Plano, TX (US)

(73) Assignee: Illinois Tool Works Inc., Glenview, IL (US)

( * ) Notice: Subject to any disclaimer, the term of this patent is extended or adjusted under 35 U.S.C. 154(b) by 464 days.

(21) Appl. No.: 12/715,506

(22) Filed: Mar. 2, 2010

(65) Prior Publication Data

US 2011/0218772 A1    Sep. 8, 2011

(51) Int. Cl.
*G06F 17/50* (2006.01)

(52) U.S. Cl.
CPC ........ *G06F 17/5004* (2013.01); *G06F 2217/02* (2013.01); *G06F 2217/06* (2013.01)

(58) Field of Classification Search
CPC .......... G06F 17/5004; G06F 17/30241; G06F 3/0481; G06F 17/3087; G06F 2217/02; G06F 2217/06; G06Q 30/06; G06Q 29/106; G06Q 40/00; G06Q 40/02
USPC ........................................................... 703/1
See application file for complete search history.

(56) References Cited

U.S. PATENT DOCUMENTS

| 6,922,701 | B1 | 7/2005 | Ananian et al. | |
|---|---|---|---|---|
| 7,620,525 | B2 | 11/2009 | Denny et al. | |
| 2008/0208654 | A1* | 8/2008 | Nahikian et al. | 705/7 |
| 2010/0070241 | A1* | 3/2010 | Opdahl et al. | 703/1 |
| 2010/0198563 | A1 | 8/2010 | Plewe | |
| 2011/0082701 | A1* | 4/2011 | Sagar | 705/1.1 |

FOREIGN PATENT DOCUMENTS

| EP | 2 234 027 A1 | 9/2010 |
|---|---|---|
| WO | WO 2008/004892 A1 | 1/2008 |
| WO | WO 2008/078337 A1 | 7/2008 |

OTHER PUBLICATIONS

Cadsoft "Envisioneer 2.5 Quick Start Guide", 2004, Cadsoft Corporation, pp. (1, 70, 71).*

(Continued)

*Primary Examiner* — Kamini S Shah
*Assistant Examiner* — Cedric D Johnson
(74) *Attorney, Agent, or Firm* — Alston & Bird LLP

(57) ABSTRACT

A method for providing an options configurator may include receiving an indication of a hierarchical structure of building plan options applicable to an enterprise, enabling a user to define option sets including selected ones of the building plan options, enabling the user to associate different ones among the option sets with corresponding different entities within the enterprise based on distinguishing characteristics of the respective different entities, and providing for generation of building information models and their derivatives based on selected options within an option set. A corresponding apparatus and computer program product are also provided.

21 Claims, 8 Drawing Sheets

(56) References Cited

OTHER PUBLICATIONS

Cadsoft "Envisioneer 2.5 Quick Start Guide", 2004, Cadsoft Corporation.*
Search Report and Written Opinion for International Application No. PCT/US2011/026426, completed May 20, 2011; 12 sheets.
Medjdoub, B., et al.; "Separating topology and geometry in space planning"; Computer-Aided Design; vol. 32; No. 1; Jan. 1, 2000; pp. 39-61.
Communication pursuant to Rules 161(1) and 162 EPC; dated Oct. 10, 2012.
Office Action from related Canadian Patent Appl. No. 2,789,477, dated Mar. 11, 2014.
Office Action for Canadian Application No. 2,789,477 dated Apr. 7, 2015.
Office Action for Canadian Patent Application No. 2,789,477 dated Apr. 4, 2016.

* cited by examiner

METHOD, COMPUTER PROGRAM PRODUCT AND APPARATUS FOR PROVIDING A BUILDING OPTIONS CONFIGURATOR

TECHNOLOGICAL FIELD

Embodiments of the present invention relate generally to computer aided design technology and, more particularly, relate to a method, computer program product and apparatus for providing an options configurator for use in connection with computer aided design and building information modeling.

BACKGROUND

The modern construction era has brought about a tremendous expansion of the use of technology and computers in connection with designing and building structures of all types. Building Information Modeling (BIM), which is an accurate computer generated representation of a building, is one area that has fueled the expansion of the integration of computers into areas such as building design. In this regard, BIM may be used to increase the productivity and capability of architects and draftsmen to design buildings and produce corresponding engineering drawings and other downstream deliverables. These deliverables can then be easily modified and regenerated by revising the original model.

Production builders are one example of an industry segment that benefits from the advantages that can be offered by BIM. In this regard, for example, production builders typically build a relatively large number of houses from a set of basic plans and then provide various options for buyers to implement according to their budget and desires. Many production builders also have specialized sales staff that work with potential buyers to provide guidance for the presentation and selection of various options. The ability to provide options is often very attractive to buyers who wish to customize their house to some degree. In addition, options provide a vehicle for additional incremental sales at higher margins for the builder. However, the provision of options also has the potential for both profit or loss for builders. In this regard, for example, some options may be relatively simple to implement or at least may not present problems when actually building a structure, while other options may significantly complicate the building process and may lead to cost overruns that may severely damage the builder's bottom line.

To facilitate management of options integration, options configurators have been developed that aim to assist builders in providing options to potential buyers in a way that is attractive to buyers, but is also useful for the builder. However, typical options configurators may rigidly apply predetermined options and therefore have limited flexibility and adaptability. Moreover, typical options configurators may be relatively rigid in relation to the ability to define options specific to different segments of an organization.

Accordingly, it may be desirable to provide an options configurator that addresses at least some of the issues described above.

BRIEF SUMMARY

A method, apparatus and computer program product are therefore provided for the provision of an options configurator. In this regard, for example, some embodiments of the present invention may provide an options configurator that enables the definition of option sets that may be tailored to specific regions or segments of a company. Furthermore, according to some embodiments, an options configurator may be provided that is able to determine and/or merge model components between options without being limited by pre-configured component merging combinations.

In one example embodiment, a method for providing an options configurator is provided. The method may include receiving an indication of a hierarchical structure of building plan options applicable to an enterprise, enabling a user to define option sets including selected ones of the building plan options, enabling the user to associate different ones among the option sets with corresponding different entities within the enterprise based on distinguishing characteristics of the respective different entities, and providing for generation of building information models and their derivatives based on selected options within an option set.

In another example embodiment, a computer program product for providing an options configurator is provided. The computer program product includes at least one computer-readable storage medium having computer-executable program code instructions stored therein. The computer-executable program code instructions may include program code instructions for receiving an indication of a hierarchical structure of building plan options applicable to an enterprise, enabling a user to define option sets including selected ones of the building plan options, enabling the user to associate different ones among the option sets with corresponding different entities within the enterprise based on distinguishing characteristics of the respective different entities, and providing for generation of building information models and their derivatives based on selected options within an option set.

In another example embodiment, an apparatus for providing an options configurator is provided. The apparatus may include a processor configured to perform at least receiving an indication of a hierarchical structure of building plan options applicable to an enterprise, enabling a user to define option sets including selected ones of the building plan options, enabling the user to associate different ones among the option sets with corresponding different entities within the enterprise based on distinguishing characteristics of the respective different entities, and providing for generation of building information models and their derivatives based on selected options within an option set.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 4A:
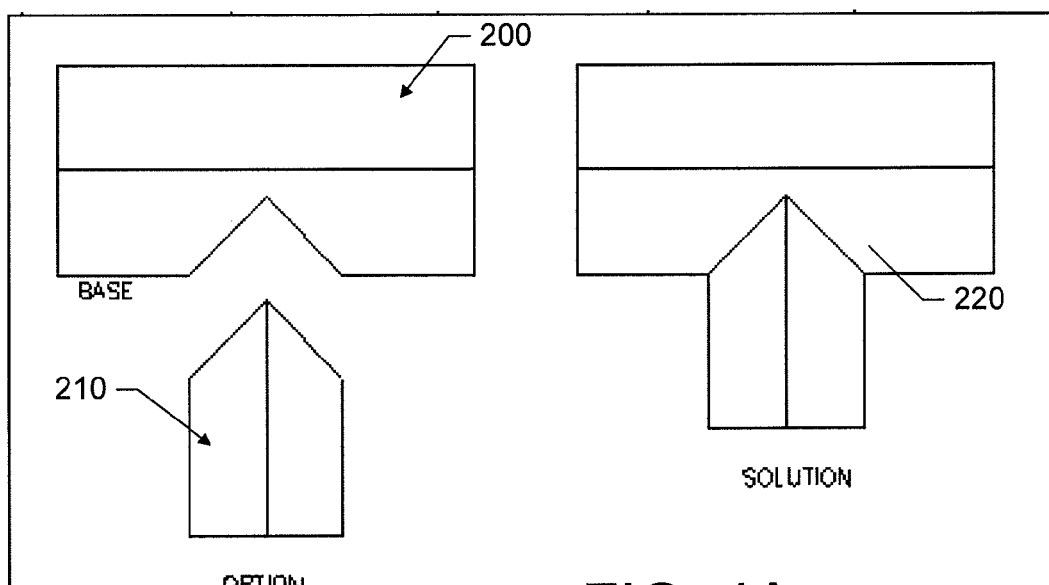
Figure 4B:
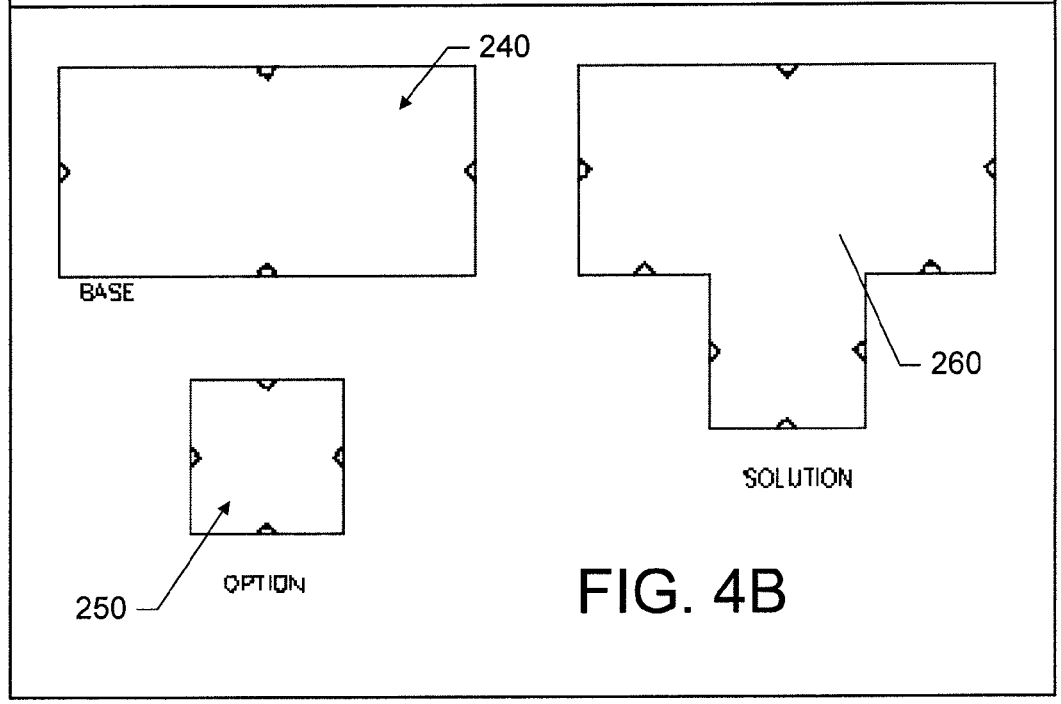
Figure 5:
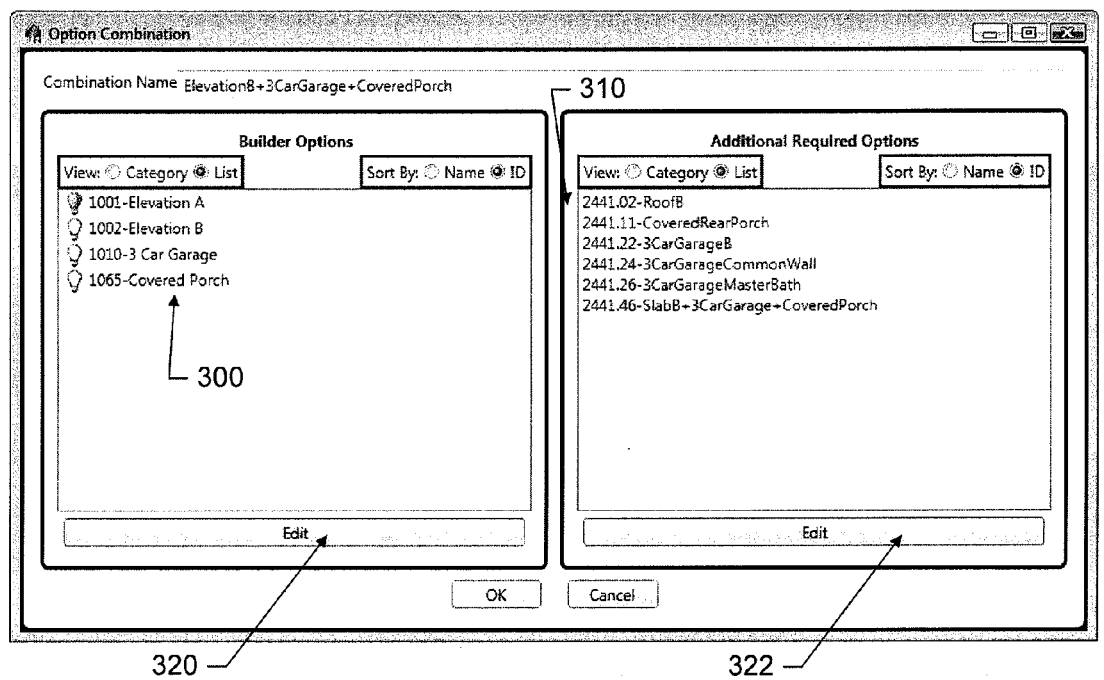
Figure 6:
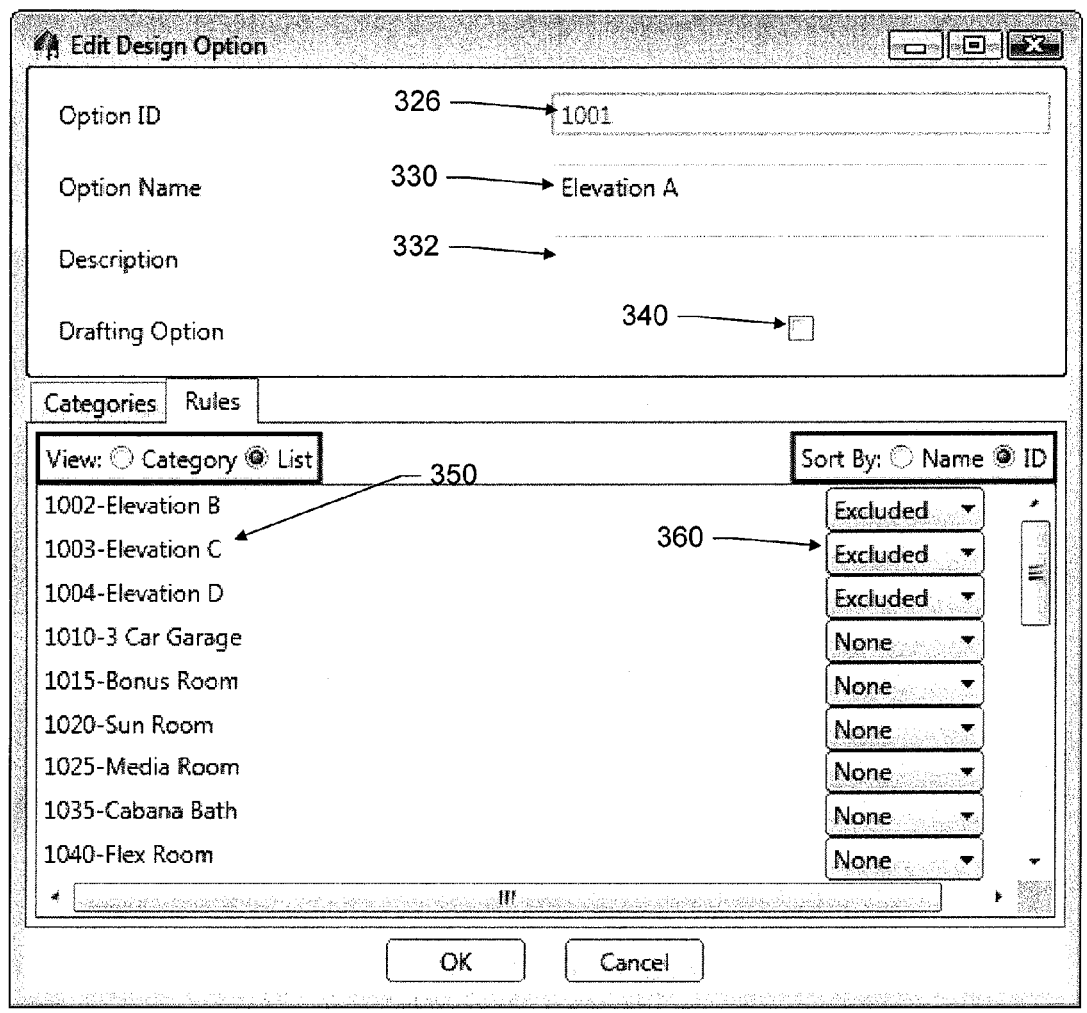
Figure 7:
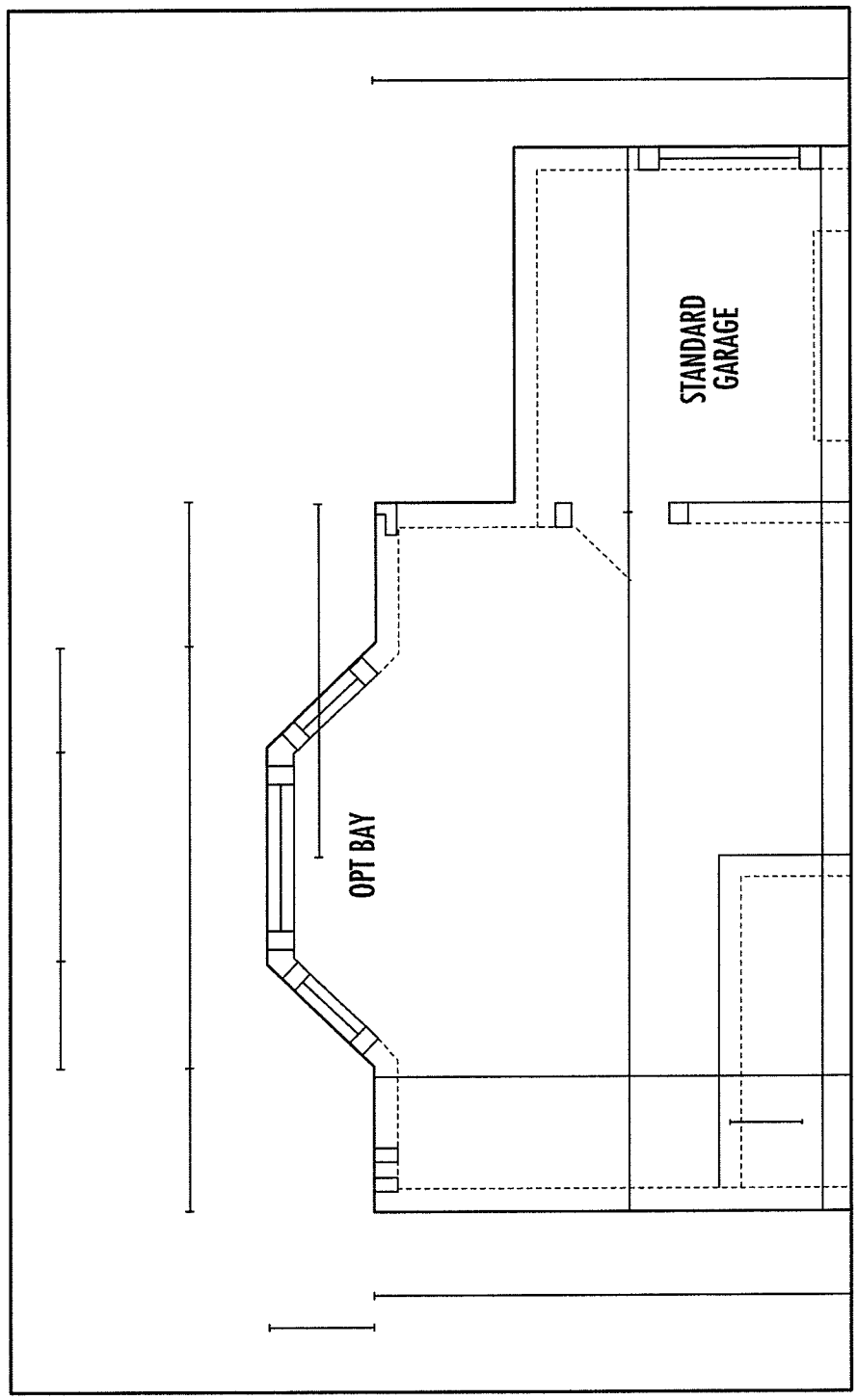
Figure 8:
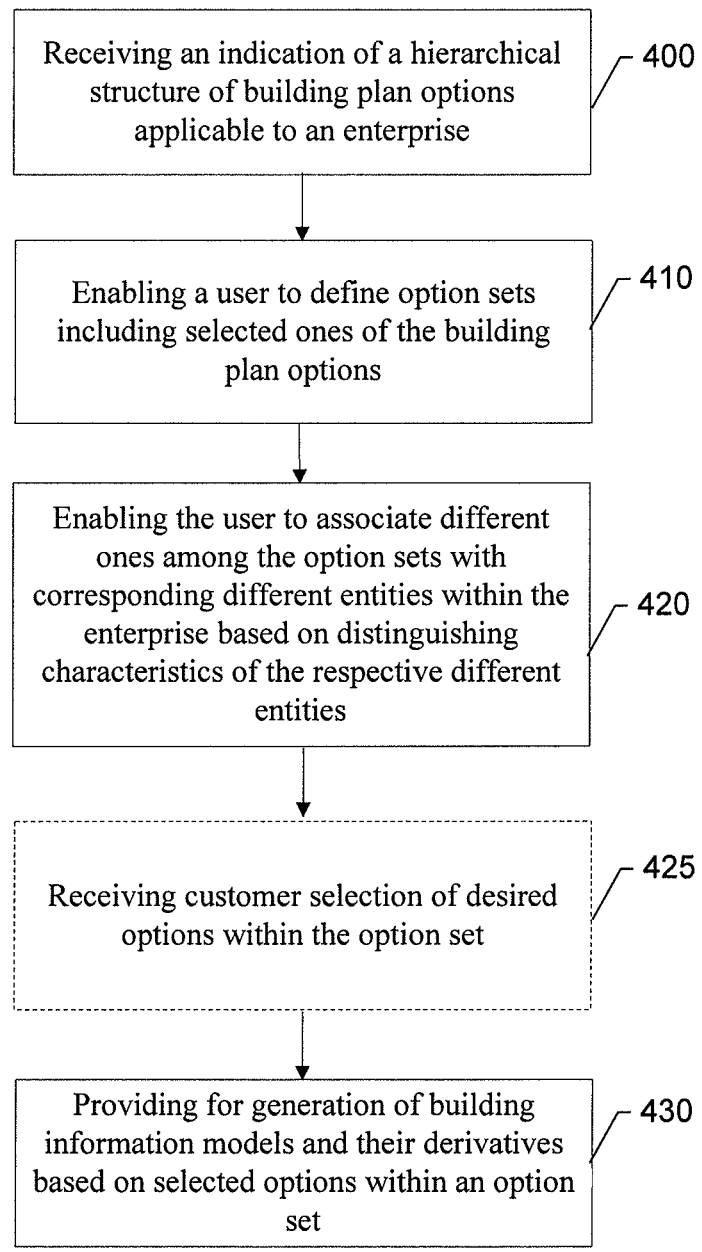

FIG. 3, which includes FIGS. 3A to 3D, shows a combination of simplified images of plan drawings corresponding to options selected by a customer according to an example embodiment of the present invention;

FIG. 4, which includes FIGS. 4A and 4B, shows differences between a typical roof modeler and the options configurator of an example embodiment of the present invention;

FIG. 5 illustrates an example of dialog boxes that may be provided by an interface manager in connection with an options manager according to an example embodiment of the present invention;

FIG. 6 illustrates an option editor screen according to an example embodiment of the present invention;

FIG. 7 is a plan drawing generated according to an example embodiment of the present invention; and FIG. 8 is a block diagram according to an example method for providing an options configurator according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Furthermore, as defined herein a "computer-readable storage medium," which refers to a physical storage medium (e.g., volatile or non-volatile memory device), can be differentiated from a "computer-readable transmission medium," which refers to an electromagnetic signal.

As indicated above, embodiments of the present invention relate to the provision of an options configurator. More specifically, some embodiments of the present invention relate to the provision of an options configurator that provides an enterprise with the ability to define option sets for various levels of hierarchy within the enterprise. Some embodiments may also enable the provision of an options configurator that is configured to dynamically resolve structural bridging components when options are integrated together without being limited by preconfigured component bridging combinations. As such, some embodiments of the present invention provide for the integration modeling and administrative aspects into a single package to provide flexible control of options while feeding the options selected directly into the modeling environment for dynamic resolution of plans, drawings and other engineering or design related deliverables.

Embodiments of the present invention may be offered via a network environment so that various different terminals may access functionality associated therewith. As such, various (sometimes remotely located) client terminals may access a service platform capable of serving information to each respective client terminal in accordance with exemplary embodiments. In some cases, the service platform may host a web application that is accessible by the client terminals or may host a service application that interacts with a corresponding client application at each respective client terminal. However, in alternative embodiments, an application may be executed at one or more of the client terminals in a stand alone mode using updateable software that may run on the client terminal. Other architectures for supporting deployment of embodiments of the present invention are also possible. However, an example architecture will be described in connection with FIG. 1 to illustrate an exemplary embodiment.

Figure 1:
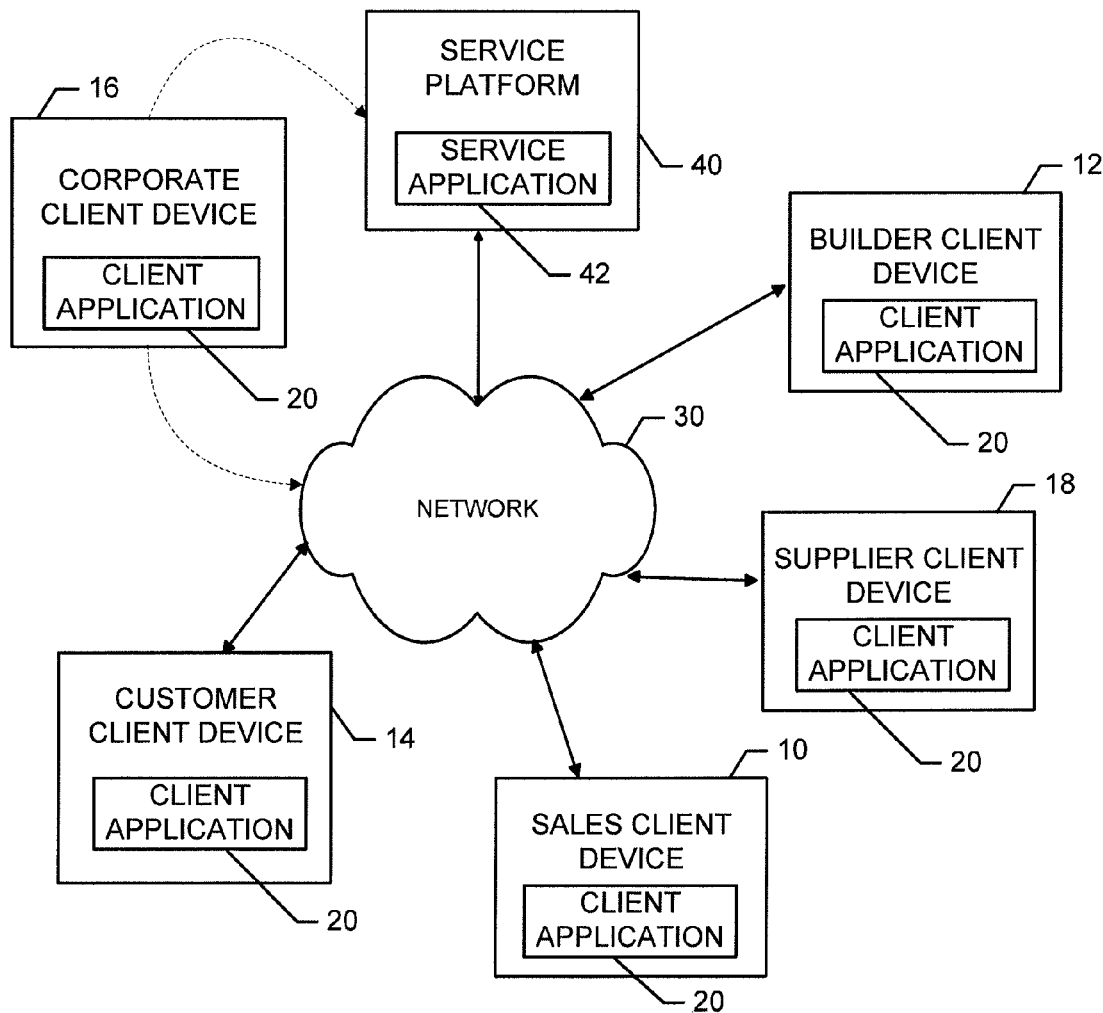
FIG. 1 is a schematic block diagram of a communication system according to an example embodiment of the present invention.

FIG. 1 illustrates a generic system diagram in which a device such as a mobile terminal 10, which may benefit from embodiments of the present invention, is shown in an example communication environment. As shown in FIG. 1, an embodiment of a system in accordance with an example embodiment of the present invention may include one or more client terminals. In some cases, the client terminals may be associated with different entities that may interact with embodiments of the present invention. Thus, for example, a sales client device 10, a builder client device 12, a customer client device 14, a corporate client device 16 and a supplier device 18 may each be examples of client terminals associated with respective different entities. Each of the client terminals may be a computer, access terminal, or other device capable of executing an application (e.g., client application 20) according to an example embodiment of the present invention. As such, in some cases, the client terminals may even be mobile terminals such as laptop computers or smart phones.

In an example embodiment, the client terminals may be capable of communication with a network 30 that may link each client terminal to other client terminals and/or to a service platform 40. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of wireless communication protocols. Alternatively, the network 30 may include communication interfaces supporting landline based or wired communication via fixed access mechanisms such as digital subscriber line (DSL), cable modems, Ethernet and/or the like. As such, the network 30 may be part of a data network, such as a local area network (LAN), a metropolitan area network (MAN), and/or a wide area network (WAN), such as the Internet. By directly or indirectly connecting the client terminals and/or the service platform 40 and other devices to the network 30, the client terminals and/or the service platform 40 may be enabled to communicate with the other devices or each other, for example, according to numerous communication protocols including Hypertext Transfer Protocol (HTTP) and/or the like, to thereby carry out various communication or other functions of the client terminals and/or the service platform 40, respectively.

In an example embodiment, the service platform 40 may be a device or node such as a server or other processing circuitry. The service platform 40 may have any number of functions or associations with various services. As such, for example, the service platform 40 may be a platform such as a dedicated server, backend server, or server bank associated with a particular information source, function or service. Thus, the service platform 40 may represent one or more of a plurality of different services or information sources. The functionality of the service platform 40 may be provided by hardware and/or software components configured to operate in accordance with known techniques for the provision of information to users of communication devices, except as modified as described herein.

In an example embodiment, the service platform 40 may provide, among other things, a service application 42 configured to provide functionality for an options configurator. Thus, according to some embodiments, the service application 42 may provide a web page interface that may be accessible by the client terminals via execution of a corresponding client application 20 at each respective client terminal. As described above, in some embodiments, the client applications 20 themselves may be enabled to provide an options configurator independent of the service application 42, while in still other alternative embodiments, the service application 42 may serve functionality and information associated with an options configurator to the client terminals via the client applications 20 at each respective client terminal via other client/server related mechanisms.

In an example embodiment, the client applications 20 at each client terminal may be the same. In such examples, the client applications 20 may provide for access restrictions and enablements to different functionalities and/or information sets to clients based on identity or authentication information provided by each potential user. Thus, for example, sales personnel may have corresponding access restrictions and enablements for functionality and information that is pertinent to sales personnel. Meanwhile, corporate personnel may have access to expanded sets of functionality and information based on login information provided by the corporate personnel granting access to administrative functionality and information that is not otherwise accessible to sales personnel. Similarly, customers may be provided with login information or otherwise access to an unrestricted portion of a website or functionality provided by the service platform 40 that provides options selection and certain viewing capabilities that are appropriate for customers. Builders may be enabled to access engineering drawings and other information specific to builders access needs.

As an alternative, different software may be provided in association with each client application 20. As such, for example, software may be loaded onto the sales client device 10 to enable a sales agent to perform only needed functionality and similarly tailored software may be loadable at each other one of the client terminals. In other words, software that is specific to the access and functionality to be granted to a particular entity may be loaded onto the client terminal of each respective entity.

Figure 2:
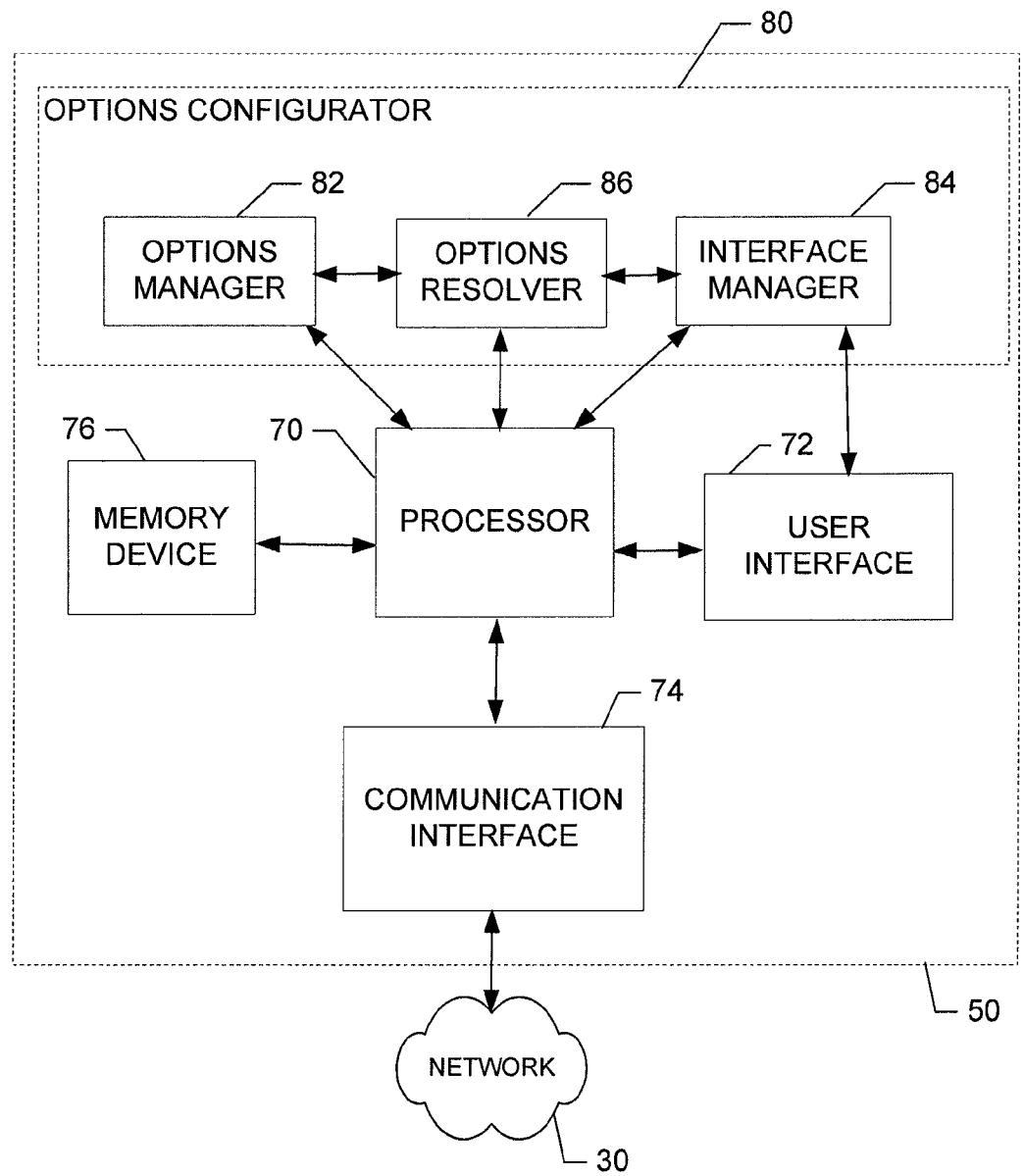
FIG. 2 is a schematic block diagram of an apparatus for providing an options configurator according to an example embodiment of the present invention.

FIG. 2 illustrates a schematic block diagram of an apparatus for enabling the provision of an options configurator according to an example embodiment of the present invention. Some embodiments of the present invention may be embodied wholly at a single device (e.g., the client terminals or the service platform 40) or by devices in a client/server relationship. Furthermore, it should be noted that the devices or elements described below may not be mandatory and thus some may be omitted in certain embodiments. An example embodiment of the invention will now be described with reference to FIG. 2, in which certain elements of an apparatus 50 for providing an options configurator are displayed. The apparatus 50 of FIG. 2 may be employed, for example, on a client terminal (e.g., client device 10, builder client device 12, customer client device 14, corporate client device 16, and/or supplier client device 18) and/or the service platform 40 or any of a variety of other devices. The apparatus 50 may therefore be a platform for execution of the client application 20 or the service application 42 to the extent that such execution performs the functionality described herein. Thus, for example, the components described in connection with FIG. 2 may form the structure or means by which various functionalities of embodiments of the present invention and functionalities of the client application 20 or service application 42 is executed.

Referring now to FIG. 2, an apparatus 50 for providing an options configurator is provided. The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structure configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70. In some embodiments, the memory device 76 may also or alternatively store content items (e.g., option sets, option combination rules, CAD drawings, template data and/or the like).

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a client terminal or service platform 40) adapted for employing embodiments of the present invention by further configuration of the processor 70 by instructions for performing the algorithms and/or operations described herein. In some cases, the processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus 50 is embodied as a server or some other network devices (e.g., the service platform 40), the user interface 72 may be limited, provided remotely (e.g., from a client terminal or another device) or eliminated. However, in an embodiment in which the apparatus is embodied as a client terminal, the user interface 72 may include, among other devices or elements, any or all of a speaker, a microphone, a display, and a keyboard or the like.

In an example embodiment, the processor 70 may be embodied as, include or otherwise control an options configurator 80 that may include an options manager 82, an interface manager 84 and an options resolver 86. The options manager 82, the interface manager 84 and the options resolver 86 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the options manager 82, the interface manager 84 and the options resolver 86, respectively, as described below. Thus, in examples in which software is employed, a device or circuitry (e.g., the processor 70 in one example) executing the software forms the structure associated with such means.

In an example embodiment, the options manager 82 may be configured to manage building options in an environment outside of computer aided drafting (CAD). As such, for example, the options manager 82 may manage the provision of a hierarchy of available options for the definition of option sets. The option sets may be tailored to specific regions, divisions, builder organizations or other entities. Thus, the options manager 82 may be configured to enable the formation of option sets that define, from a global list of options available within the entire enterprise (e.g., a global options list), the specific options and/or combinations of options that are to be made available in a particular context (e.g., such as for a particular region, division or organization within the enterprise). In an example embodiment, the options manager 80 may provide an ability to edit available options (e.g., to add or delete options from the global options list), define option sets (e.g., select particular options from the global options list to be provided within a specific set or for a particular entity), modify option sets, and/or perform other modification to the hierarchy of available options. As such, in some cases, the options manager 82 may act as an options editor to allow corporate personnel to define specific options to be made available to specific regions or entities, at specific times or seasons, or under specific circumstances. The options editor functionality of the options manager 82 may therefore only be accessible to authorized personnel (e.g., via the corporate client device 16).

In an example embodiment, standardized options from the hierarchy of available options may be defined for various plans, elevations, or other distinct building styles within corresponding option sets. The option sets may define, within the hierarchy, specific sub options that are enabled or excluded based on the selection of a particular option or sub option. Thus, for example, selection of a particular option item may enable further selection of items among a specific set of sub options that has been previously associated with the particular option via the structure of the hierarchy. Similarly, selection of a particular option item may disable or exclude further selection of items among a specific set of sub options that have been previously defined to be exclusions with respect to the particular option via the structure of the hierarchy.

In some embodiments, the options manager 82 may also track options selection when an embodiment of the present invention is employed by a customer (e.g., at the customer client device 14) or by a sales agent (e.g., at the sales client device 10) to enable the customer to select options. Thus, for example, if the customer selects a particular model, elevation and corresponding options, the options manager 82 may include an option selector function to track each option selected for provision to the option resolver 86 to enable generation of drawings, images and plans (e.g., BIM and their derivatives) modified according to the options selected. Accordingly, during operation, the options manager 82 may have functionality accessible by authorized personnel for the establishment and modification of a hierarchy of options, for definition of option sets to be offered to potential customers, for updating enabled and disabled options based on option selections made by the customer for a selected option set, and for the tracking of each option selection made by the customer for use by the option resolver 86 to resolve bridging of options and corresponding components based on the option selections made by the customer.

In some embodiments, the option manager 82 may be configured to employ rules (e.g., which may be stored in the memory device 76) that may be defined by drafters, builders or other corporate personnel to define the relationships between options within the hierarchy. As such, for example, rules may relate selection of one option to enablement, automatic inclusion, or exclusion of other options at the same level, lower levels or direct parent levels than the option currently selected. In some cases, selections may be made with respect to primary options and drafting options as described in greater detail below. Selecting or deselecting one primary option may, by rule, enable, disable or automatically include other primary options or drafting options. These options may then be reflected in a listing of options presented to the user when the user is employing option selection.

The interface manager 84 may be configured to present a graphic display, via the user interface 72, of information relating to options of the hierarchy of options or an option set. The interface manager 84 may also be configured to present a graphic display of drawings, plans, renderings, summaries and other data related to options selection and generation of resulting information based on options selection. As such, for example, the interface manager 84 may be configured to manage presentation of content (e.g., content regarding editing options, selecting options, summarizing selected options, producing drawings or images such as BIM and their derivatives based on selected options and/or the like) to one or more users. In an example embodiment, content may be presented by the interface manager 84 via a web page offered in a web browser interface or via the presentation of modified template pages that are filled with data from fields, entries or selections associated with option selection.

As indicated above, the interface manager 84 may provide the display to multiple users. Thus, in an example embodiment, multiple different users may be enabled to conduct options definition, editing, selection or rendering all at the same time. In such cases, the interface manager 84 may be configured to provide only the corresponding views that are associated with the particular user conducting the corresponding actions. In other words, if multiple users are conducting actions related to options management, a particular user may only be provided with a graphic display of the data that correspond to the actions the particular user is conducting.

The options resolver 86 may be configured to receive options selections made by the customer or sales agent and combine the options into a final set of selected options for resolving plans, drawings, images or other graphic displays associated with BIM and their derivatives that are generated based on the selected options. Thus, for example, the options resolver 86 may include hardware and software for resolving option combinations to determine a final output and also may interface with CAD functionality that may be accessible to or a part of the options resolver 86 to generate drawings according to the determined final output.

In an example embodiment, the options resolver 86 may be configured to dynamically resolve option combinations without reliance on pre-calculated or predetermined combinations. As such, for example, if a particular option or combination of options is selected and the selected options require modification, merging or bridging of components from two separate plan portions representing base or option designs, the options resolver 86 can dynamically determine and/or merge model components. In some embodiments, the merging of model components may include resolving the geometry of merged components for regenerating the model with the resolved components (e.g., in some cases in 3D). Thus, unlike many conventional option configurators for which the modeling environment and the options selection environments that are directly tied to each other, the options configurator 80 employs the options resolver 86 that allows the options selection environment to be separated from the modeling environment by resolving modifications that must be made responsive to options selected dynamically or on the fly in the modeling environment. In other words, rather being limited to combinations for which predetermined model components are already in storage or pre-generated, embodiments of the present invention enable the dynamic determination and generation of merged model components without any need for predetermined model component calculations involving the options being combined. As an example, when combining a base floor plan with an optional sunroom, the roof of the resulting structure is typically modified to blend the sunroom roof into the existing base roof line. For a typical conventional options configurator, the ability to select the option is directly tied to the predetermined combination roof structure involving pre-calculated and modeled roofing components and pre-drawn model components and/or drawings for the resulting combination. However, according to an example embodiment, the option manager 82 may be enabled to provide an option for adding the sunroom without need for pre-calculated roofing components and pre-drawn model components or drawings for the resulting combination. Instead, the options resolver 86 will dynamically generate the merged model components to resolve the resultant roof and generate corresponding building model representations for presentation by the interface manager 84.

A benefit of the options resolver 86 may be clearly realized when considering a situation in which the customer decides to further modify the above described combination by changing the elevation of the sunroom. For example, if the wall height of the sunroom is changed, the conventional options configurator could only accommodate the change if a pre-calculated roof structure for the particular combination of the sunroom having the different wall height and the base structure is already pre-stored. However, embodiments of the present invention can accommodate the combination as long as it was enabled during options editing since the merging model components for the changed combination will be resolved dynamically and therefore need not be predetermined.

Figure 3A:
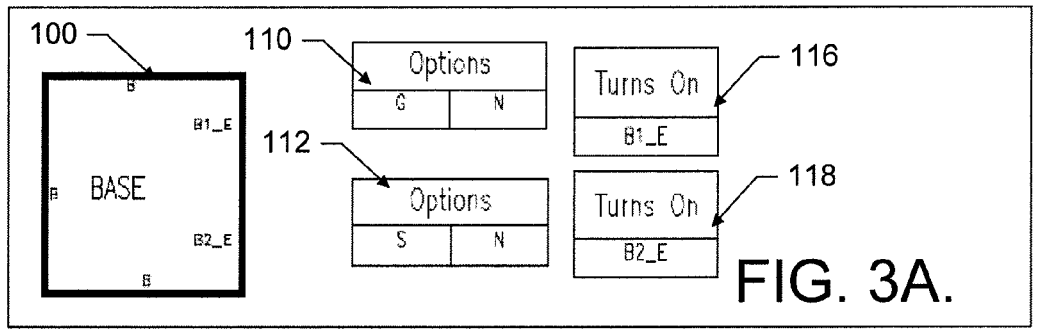

Some examples relative to the discussion above are provided in reference to FIG. 3, which includes FIGS. 3A to 3D. FIG. 3 shows a combination of simplified images of plan drawings corresponding to options selected by a customer according to an example embodiment. FIG. 3A shows a base structure 100 that is associated with at least two options including the addition of a game room and a sunroom. Option menu 110 provides a code for the game room option (e.g., the letter "G") and a corresponding indication as to whether the option is selected or not selected. In the example of FIG. 3A, the game room option is not selected and thus an "N" appears in association with the game room option code. Similarly, option menu 112 provides a code for the sunroom option (e.g., the letter "S") and a corresponding indication as to whether the option is selected or not selected. In the example of FIG. 3A, the sunroom option is not selected and thus an "N" appears in association with the sunroom option code. The base structure 100 includes three standard walls identified by the letter "B" that may each have a corresponding standard height, width, finish, and/or other characteristics. The base structure 100 may also include a fourth wall that is generated based on the options selected. In this example, the fourth wall is generated based on the fact that the sunroom and game room options have not been selected. As shown in FIG. 3A, the non-selection of the game room option turns on another option which defines a portion of the fourth wall as a base model component for the wall identified by the code B1_E as shown in option block 116. Similarly, non-selection of the sunroom option turns on an option defining the remainder of the fourth wall as a base model component for the wall identified by the code B2_E as shown in option block 118.

Figure 3B:
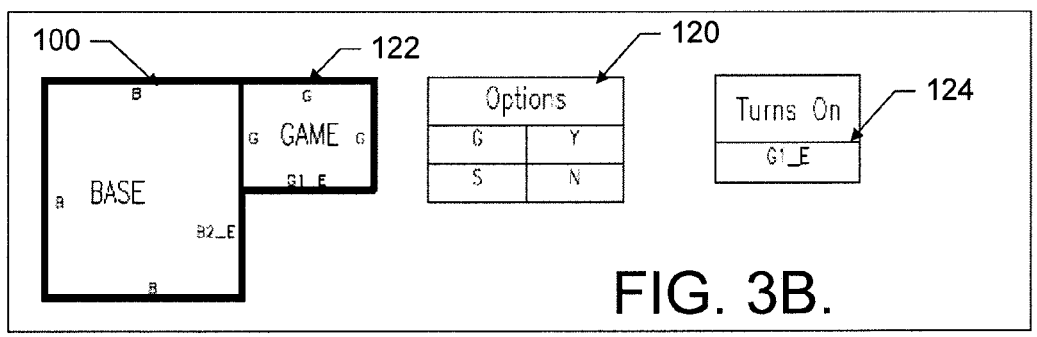

FIG. 3B shows a modification to the options selections of FIG. 3A in that the game room option is selected for inclusion as indicated by the code "Y" provided in association with the game room option in option menu 120. A game room structure 122 is also shown in combination with the base structure 100. The portion of the fourth wall of the base structure 100 that was previously coded B1_E is then replaced with a standard game room wall indicated by the letter "G", which represents all walls utilized for the game room in this example. Meanwhile, option block 124 indicates that the final wall of the game room structure 122 is a drafting option indicated by code G1_E. As can be seen from this example, if a primary option for the game room is selected, then corresponding drafting options regarding the primary option may be turned on or enabled. Moreover, selection of particular primary options may enable the selection of or mandate exclusion of other primary options. Primary options may be options that are sellable as a complete item and are therefore visible to personnel (e.g., sales persons, customers, etc.) other than the user creating option sets. As such, primary options may be "customer facing" options. Meanwhile, drafting options are those pieces used to assemble a primary option or combination of primary options. As such, drafting options are actually typically only seen by the draftsman or creator of the drafting option. Drafting options are therefore hidden from the customer, vendor or builder to make an interface that is easier to digest for these entities.

Figure 3C:
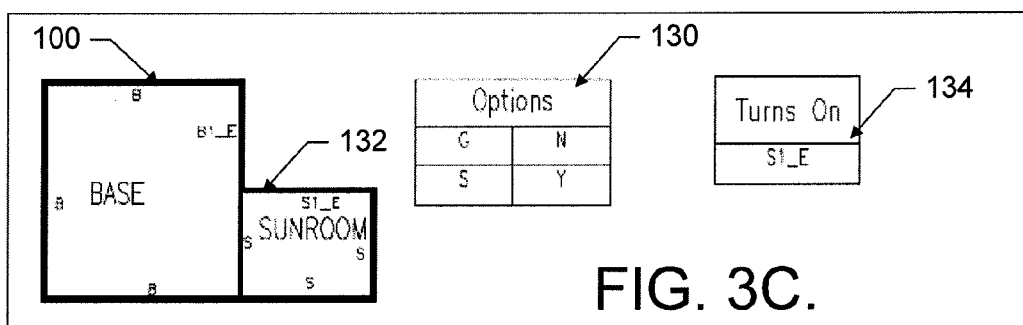

FIG. 3C shows a modification to the options selections of FIG. 3A in that the sunroom option is selected for inclusion as indicated by the code "Y" provided in association with the sunroom option in option menu 130. A sunroom structure 132 is also shown in combination with the base structure 100. The portion of the fourth wall of the base structure 100 that was previously coded B2_E is then replaced with a standard game room wall indicated by the letter "S", which represents all walls utilized for the sunroom in this example. Meanwhile, option block 134 indicates that the final wall of the sunroom structure 132 is a drafting option indicated by code S1_E.

Figure 3D:
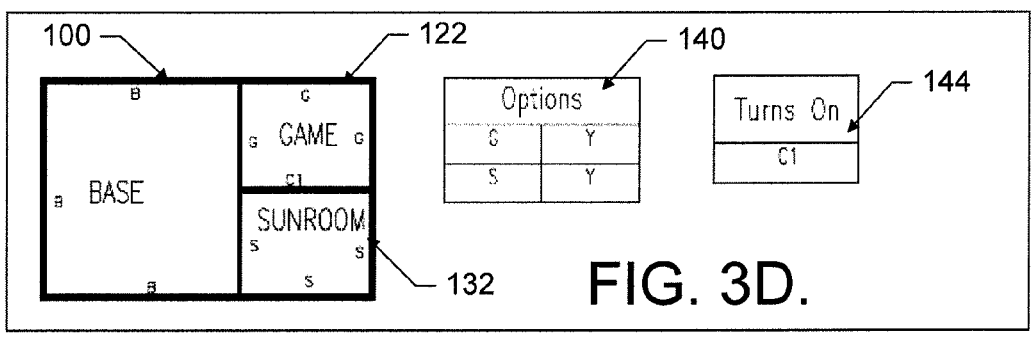

FIG. 3D shows a modification to the options selections of FIG. 3A in that the game room and sunroom options are selected for inclusion as indicated by the code "Y" provided in association with the game room and sunroom options in option menu 140. The game room structure 122 is also shown in combination with the base structure 100 and the sunroom structure 132. The portion of the fourth wall of the base structure 100 that was previously coded B1_E is then replaced with a standard game room wall indicated by the letter "G", which represents all walls utilized for the game room in this example. Meanwhile, the portion of the fourth wall of the base structure 100 that was previously coded B2_E is then replaced with a standard game room wall indicated by the letter "S", which represents all walls utilized for the sunroom in this example. Option block 144 indicates that the wall between the game room structure 122 and the sunroom structure 132 is a drafting option indicated by code C1 for a composite wall. Accordingly, as shown in FIGS. 3A to 3D, combinations may manage interactions between primary options with respect to modeling operations in some cases. The resultant roofs of each of the structures in FIGS. 3A to 3D are each different as well and may be determined or resolved dynamically such that there is no requirement for pre-calculated merging model components or pre-drafted drawings in order to render the resultant combinations via the interface manager 84.

FIG. 4, which includes FIGS. 4A and 4B, shows differences between a typical roof modeler and the options configurator 80 of example embodiments of the present invention. In this regard, FIG. 4A shows how a base structure 200 is added to an option structure 210 to generate a resultant roof solution 220. In the illustrated example, the option structure 210 includes predetermined merging model components to complete integration of the option structure 210 into the base structure 200. As such, every piece of the option structure is pre-created and therefore a relatively large number of pre-created pieces for each anticipated combination must be generated and stored. In other words, the embodiment of FIG. 4A is merely configured to assemble pre-drawn pieces.

To the contrary, FIG. 4B merely takes the base structure 240 and the option structure 250 with corresponding information defining the parameters of each wall associated with each respective structure and combines the structures to produce a composite structure 260 using the parameters associated with each option to resolve the roof structure with corresponding merging model components dynamically. Thus, for example, parameters of the walls of the base structure 240 and/or the option structure 250 may be altered and the composite structure 260 may still be resolved even though no pre-generated or stored images, model components, or combination options are in existence. As such, the parameters of the walls and even parameters associated with the roof itself (e.g., roof pitch, heel heights, overhang configurations, etc.) may be altered without reliance on pre-existing drawings, model components, or calculations for such changes and the option configurator 80 is still able to generate a corresponding roof structure by utilizing parameters associated with the combined structures and dynamically resolving and generating a corresponding roof based on the requirements associated with the parameters.

Accordingly, embodiments of the present invention may merge CAD/BIM (computer aided drafting/building information modeling) with management functions so that, for example, corporate hierarchy of an enterprise may be incorporated into the options configurator to allow options to be managed by various levels in an organization. For example, options that are available across the entire enterprise may be standardized to enable usage by all levels of the enterprise. Options may also be configured for restricted use by certain levels of the enterprise or certain organizations of the enterprise (e.g., regions, divisions, sub-divisions, etc.). In some embodiments, options or option sets that are established for a particular level or entity may only be seen by other levels under the particular level within the enterprise hierarchy.

The options configurator 80 of example embodiments may also provide designers with enablement for dividing options into a hierarchy including primary options and corresponding drafting options associated with respective ones of the primary options. Drafting options may be pieces required to combine primary options that only the drafter will see. The primary options (or builder options) may be options that are seen by management or buyers. The options configurator 80 may therefore enable rules to be written to allow management or buyers to select combinations of primary options. Drafting options and primary options may then be either enabled, for subsequent selection, automatically included (added), or automatically excluded (not allowed) based on the rules to create a final solution. Rules may be provided in connection with a list of options and their corresponding selected states. If a combination is matched, a set of post requisite options may be included. Thus, for example, some combinations may require that if a particular option (e.g., option A) is on, then another option (e.g., option B) must be on as well. Other combinations may set a default option if a particular option is not selected. Additionally, in some situations, combinations may include enabled features in combination with disabled features. Thus, for example, if only two options are available for a particular feature, failure to select one option may automatically dictate that the other option is activated.

As indicated above, different types of users may have different levels of interaction with embodiments of the present invention. Thus, for example, customers and sales personnel may have interactions in relation to selecting options and reviewing final or intermediate drawings or illustrations of designs/models based on the options selected. Builders may have similar interaction capability to that described above, but may also have access to engineering drawings and other drafting and construction related plans or images. In some cases, builders may also be enabled to access options editing to edit options that are otherwise available within their region or according to their division or business organization to customize options more specifically within the options that are available to the builder. Corporate level personnel may have full access to options entry and editing and may be enabled to define option sets or categories including mutual exclusions between options within a set or category.

In an example embodiment, once a base model and options have been designed within a particular option set, lot specific plans can be generated allowing automatic creation of three dimensional models, framing drawings, materials lists, etc. A user with corresponding access, may create a master bidset that includes all available options for a particular plan or model (e.g., bay windows, extended garages, optional bedrooms, etc.) and run a single generation routine to combine externally referenced drawings (XRefs) of an Autocad architecture (ACA) platform into a single drawing file. The XRefs may be bound and lot specific generation construction documentation and other data or information may also be generated.

Some example images of control consoles or interface tools that may be provided to implement some of the functionality described above are shown in the examples of FIGS. 5 and 6. In this regard, FIG. 5 illustrates an example of dialog boxes that may be provided by the interface manager 84 in connection with the options manager 82. As shown in FIG. 5, primary options 300 (some of which may be active while others are inactive) may be presented independently (e.g., in the dialogue box on the left) and corresponding additional required options 310 (some of which are primary options and others of which are drafting options) that are required to create a specific combination of primary options may also be presented (e.g., in the dialogue box on the right). By selection of an edit command 320 (e.g., for the appropriate combination (or set) of primary options), the user may be given options to define sets of primary options based on rules for associating respective different options. By selection of an additional required options edit command 322 (e.g., for a set of primary or drafting options), the user may be given options to define sets of additional required options based on rules for associating respective different options. Functions that may be performed with respect to options and/or combinations of options may include naming, renaming, deleting, adding, editing, setting as a default, copying, creating mutual exclusions, enabling additional options and/or the like at the option level or at the combination (or option set) level.

When editing options or an option combination, another view may be presented such as the view shown in FIG. 6, which shows an option editor screen. In some cases, editing options may be presented responsive to selection of a menu option for entering an option editor screen or by right clicking, double clicking or performing some other specific action with respect to an option shown on an options manager screen. The option editor view may include an option ID field 326, an option name field 330 and an option description field 332. Other information may also be provided or selectable such as whether or not the option is a drafting option (indicated by field 340). In some embodiments, option lists 350 may be shown (some times in hierarchical fashion) and various functions 360 associated with the options may be selected corresponding to the option from the option list 350. By selecting a function (e.g., enabled, excluded, included, none, etc.) the corresponding option may be associated to the respective option being modified.

FIG. 7 illustrates a plan drawing generated according to an example embodiment of the present invention. Other images (e.g., 3D images of a house or other building) may also be generated. As such, when a user selects objects for modification with respect to a particular option, the modifications that are provided may be immediately accessible and viewable in a corresponding plan drawing or other model representation based on the options selected.

FIG. 8 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the client terminal or server platform and executed by a processor of the client terminal or server platform. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include receiving an indication of a hierarchical structure of building plan options applicable to an enterprise at operation 400 and enabling a user to define option sets including selected ones of the building plan options at operation 410. The method may further include enabling the user to associate different ones among the option sets with corresponding different entities within the enterprise based on distinguishing characteristics of the respective different entities at operation 420 and providing for generation of building information models and their derivatives based on selected options within an option set at operation 430.

In some embodiments, certain ones of the operations above may be modified or further amplified as described below. Moreover, in some situations, the operations described above may be augmented with additional optional operations (an example of which is shown in FIG. 8 in dashed lines). It should be appreciated that each of the modifications, augmentations or amplifications below may be included with the operations above either alone or in combination with any others among the features described herein. In an example embodiment, the method may further include receiving customer selection of desired options within the option set at operation 425. In some cases, providing for generation of the plan drawings may include providing for generation of the building model based on the desired options defined within the option set. Alternatively or additionally, providing for generation of the plan drawings may include dynamically merging building model components used to combine an option structure with a basic structure after incorporation of the customer selection of the desired options (i.e., without using pre-modeled building model components). In some embodiments, receiving customer selected options within the option set may include receiving selections related to primary options, at least one of the primary options being associated with an exclusion, enablement or inclusion of another primary option or drafting option. In an example embodiment, enabling the user to associate different ones among the option sets with corresponding different entities within the enterprise based on distinguishing characteristics of the respective different entities may include associating an option set with a corresponding entity based on region, division within the enterprise, or level within the enterprise. In some cases, enabling the user to define option sets may include enabling the user to define rules for exclusion, enablement or inclusion of an option based on selection of another option.

In an example embodiment, an apparatus for performing the method of FIG. 8 above may comprise a processor (e.g., the processor 70) configured to perform some or each of the operations (400-430) described above. The processor may, for example, be configured to perform the operations (400-430) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method executable by a processor comprising:
   receiving an indication of a hierarchical structure of building plan options applicable to an enterprise;
   receiving rules defining relationships between options within the hierarchical structure;
   enabling a user to define option sets including selected ones of the building plan options;
   enabling the user to associate different option sets among the option sets with corresponding different regions based on distinguishing characteristics of the respective different regions;
   employing the rules defining relationships between options within the hierarchical structure in response to receiving selected options within the option set to both enable at least one option within the hierarchical structure and disable at least one option within the hierarchical structure; and
   generating by a processor, building information models and their derivatives based on selected options within an option set, wherein generating building information models comprises dynamically resolving a geometry of merged components in response to selection of the options to regenerate a building information model to include resolved components, wherein corresponding information defining parameters of each component associated with an option, and a combined structure is produced using the parameters associated with each option to dynamically resolve the geometry of merged components.

2. The method of claim 1, further comprising receiving customer selection of desired options within the option set.

3. The method of claim 2, wherein providing for generation of the building information models and their derivatives further comprises providing for generation of the building information models and their derivatives based on the desired options defined within the option set.

4. The method of claim 2, wherein providing for generation of the building information models and their derivatives further comprises dynamically merging building model components used to combine an option structure with a basic structure after incorporation of the customer selection of the desired options.

5. The method of claim 2, wherein receiving customer selected options within the option set comprises receiving selections related to primary options, at least one of the primary options being associated with an exclusion, enablement, inclusion, or combination of one or more primary options or drafting options.

6. The method of claim 1, wherein enabling the user to define option sets comprises enabling the user to define rules for exclusion, enablement or inclusion of an option or combination of options based on selection of another option.

7. The method of claim 1, wherein an option associated with a first region is not associated with a second region.

8. The method of claim 1, further comprising:
   enabling the user to associate different option sets among the option sets with corresponding different divisions within the enterprise based on distinguishing characteristics of the respective divisions.

9. The method of claim 1, wherein resolving the geometry of merged components to regenerate a building information model to include resolved components comprises dynamically resolving bridging of components in response to the selection of options requiring said components.

10. An apparatus comprising a processor configured to perform at least:
    receive an indication of a hierarchical structure of building plan options applicable to an enterprise,
    receive rules defining relationships between options within the hierarchical structure;
    enable a user to define option sets including selected ones of the building plan options;
    enable the user to associated different option sets among the option sets with corresponding different regions based on distinguishing characteristics of the respective different regions;
    employ the rules defining relationships between options within the hierarchical structure in response to receiving selected options within the option set to both enable at least one option within the hierarchical structure and disable at least one option within the hierarchical structure;
    and
    generate building information models and their derivatives based on selected options within an option set, wherein causing the apparatus to generate building information models comprises causing the apparatus to dynamically resolve a geometry of merged components in response to selection of the options to regenerate a building information model to include resolved components, wherein corresponding information defining parameters of each component associated with an option, and a combined structure is produced using the parameters associated with each option to dynamically resolve the geometry of merged components.

11. The apparatus of claim 10, wherein the processor is further configured to receive customer selection of desired options within the option set.

12. The apparatus of claim 11, wherein the processor is configured to provide for generation of the building information models and their derivatives further by providing for generation of the building information models and their derivatives based on the desired options defined within the option set.

13. The apparatus of claim 11, wherein the processor is configured to provide for generation of the building information models and their derivatives further by dynamically merging building model components used to combine an option structure with a basic structure after incorporation of the customer selection of the desired options.

14. The apparatus of claim 11, wherein the processor is configured to receive customer selection of desired options within the option set including receiving selections related to primary options, at least one of the primary options being associated with an exclusion, enablement or inclusion of another primary option or drafting option or a combination of primary options.

15. The apparatus of claim 10, wherein the processor is further configured to:
    enable the user to associate different option sets among the option sets with corresponding different divisions within the enterprise based on distinguishing characteristics of the respective different divisions.

16. A computer program product comprising at least one non-transitory computer-readable storage medium having computer-executable program code instructions stored therein, the computer-executable program code instructions comprising:
    program code instructions for receiving an indication of a hierarchical structure of building plan options applicable to an enterprise;
    program code instructions for receiving rules defining relationships between options within the hierarchical structure;
    program code instructions for enabling a user to define option sets including selected ones of the building plan options;
    program code instructions for enabling the user to associate different option sets among the option sets with corresponding different regions based on distinguishing characteristics of the respective different regions;
    program code instructions for employing the rules defining relationships between options within the hierarchical structure in response to receiving selected options within the option set to both enable at least one option within the hierarchical structure and disable at least one option within the hierarchical structure; and
    program code instructions for generating building information models and their derivatives based on selected options within an option set, wherein the computer program code instructions for generating building information models comprises computer program code instructions for dynamically resolving a geometry of merged components in response to selection of the options to regenerate a building information model to include resolved components, wherein corresponding information defining parameters of each component associated with an option, and a combined structure is produced using the parameters associated with each option to dynamically resolve the geometry of merged components.

17. The computer program product of claim 16, further comprising program code instructions for receiving customer selection of desired options within the option set.

18. The computer program product of claim 17, wherein program code instructions for providing for generation of the building information models and their derivatives further include instructions for providing for generation of the building information models and their derivatives based on the desired options defined within the option set.

19. The computer program product of claim 17, wherein program code instructions for providing for generation of the building information models and their derivatives further include instructions for dynamically merging building model components used to combine an option structure with a basic structure after incorporation of the customer selection of the desired options.

20. The computer program product of claim 17, wherein program code instructions for receiving customer selection of desired options within the option set include instructions for receiving selections related to primary options, at least one of the primary options being associated with an exclusion, enablement or inclusion of another primary option or drafting option or combination of primary options.

21. The computer program product of claim 16, wherein program code instructions for enabling the user to define option sets include instructions for enabling the user to define rules for exclusion, enablement or inclusion of an option based on selection of another option or combination of options.

* * * * *